United States Patent
Zou et al.

(10) Patent No.: US 12,242,596 B2
(45) Date of Patent: Mar. 4, 2025

(54) ELECTRONIC DEVICE, TRUSTED APPLICATION CALLING METHOD AND APPARATUS, DEVICE, AND MEDIUM

(71) Applicant: CHINA UNIONPAY CO., LTD., Shanghai (CN)

(72) Inventors: Fen Zou, Shanghai (CN); Chengqian Chen, Shanghai (CN); Dingzhou Li, Shanghai (CN); Xin Wang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/689,281

(22) PCT Filed: Aug. 15, 2022

(86) PCT No.: PCT/CN2022/112599
§ 371 (c)(1),
(2) Date: Mar. 5, 2024

(87) PCT Pub. No.: WO2023/071423
PCT Pub. Date: May 4, 2023

(65) Prior Publication Data
US 2025/0005135 A1    Jan. 2, 2025

(30) Foreign Application Priority Data

Oct. 29, 2021 (CN) .......................... 202111275919.8

(51) Int. Cl.
G06F 21/53    (2013.01)

(52) U.S. Cl.
CPC ........ *G06F 21/53* (2013.01); *G06F 2221/033* (2013.01)

(58) Field of Classification Search
None
See application file for complete search history.

(56) References Cited

U.S. PATENT DOCUMENTS

| 10,878,083 B2 | 12/2020 | Hlaing et al. | |
|---|---|---|---|
| 2013/0166509 A1* | 6/2013 | Clark | G06F 8/71 707/638 |

FOREIGN PATENT DOCUMENTS

| CN | 105978920 A | 9/2016 |
|---|---|---|
| CN | 107003889 A | 8/2017 |

(Continued)

OTHER PUBLICATIONS

International Search Report and Written Opinion for PCT Appl. No. PCT/CN2022/112599 mailed Nov. 1, 2022.

*Primary Examiner* — Christopher C Harris
(74) *Attorney, Agent, or Firm* — Foley & Lardner LLP

(57) ABSTRACT

An electronic device, a trusted application calling method and apparatus, a device, and a medium are disclosed. Because a trusted application development platform is linked with native trusted applications respectively corresponding to multiple trusted execution environment operating systems (TEE OS), based on the trusted application development platform, a bytecode trusted application can be applicable to any TEE OS, and for different TEE OS hardware platforms, only one corresponding bytecode trusted application needs to be developed for one application. Moreover, the trusted application development platform and the byte code trusted application can be applied to electronic devices (terminals) of different TEE OSs.

6 Claims, 6 Drawing Sheets

(56) References Cited

FOREIGN PATENT DOCUMENTS

| | | |
|---|---|---|
| CN | 109739522 A | 5/2019 |
| CN | 111382445 A | 7/2020 |
| CN | 111917696 A | 11/2020 |
| CN | 114021141 A | 2/2022 |
| TW | 201818240 A | 5/2018 |
| WO | WO-2017084555 A1 * 5/2017 ............. G06F 21/51 |
| WO | WO-2020/185417 A1 | 9/2020 |

* cited by examiner

ELECTRONIC DEVICE, TRUSTED APPLICATION CALLING METHOD AND APPARATUS, DEVICE, AND MEDIUM

CROSS-REFERENCE TO RELATED APPLICATIONS

This application is a National Stage of International Application No. PCT/CN2022/112599, filed Aug. 15, 2022, claims priority to Chinese Patent Application No. 202111275919.8, filed with the China National Intellectual Property Administration on Oct. 29, 2021 and entitled "Electronic Device, Trusted Application Calling Method and Apparatus, Device, and Medium", the content of all of which is hereby incorporated by reference in their entirety.

TECHNICAL FIELD

The present application relates to the technical field of trusted application calling, and in particular to an electronic device, and a trusted application calling method, apparatus, device and medium.

BACKGROUND

The development of mobile communication technology has brought about the rapid development of mobile terminal technology. Current mobile terminal devices provide a powerful and flexible Rich Execution Environment (REE), which causes the devices susceptible to security threats. Trusted Execution Environment (TEE) is a technical scheme provided for solving the security risk existing in the current mobile terminal devices. TEE and REE run on the same device in parallel. TEE can ensure the storage, processing and protection of sensitive data in a trusted environment, provide a secure execution environment for authorized security software (trusted software), and achieve end-to-end security through execution protection, confidentiality, integrity and data access rights. The Trusted Application (TA) runs on the TEE, and the Client Application (CA) runs on the REE. The CA uses security functions provided by the TEE and the TA by calling the TA.

The traditional TA is generally based on the machine code program running on the trusted execution environment operating system (TEE OS). For the same application, it is generally necessary to develop different versions of trusted applications for different TEE OS hardware platforms, such as Huawei iTrustee and Qualcomm QSEE, to meet requirements of different TEE OS hardware platforms.

In the related art, for the same application, different versions of trusted applications need to be developed for different TEE OS hardware platforms, resulting in problems of long development cycle and high development cost of the trusted application.

SUMMARY

The present application provides an electronic device, a trusted application calling method, apparatus, device and medium, to reduce the development cycle and the development cost of the trusted application.

In a first aspect, the present application provides an electronic device, the electronic device includes: a client application, CA, and a trusted application development platform;

the CA is configured to initiate a first access request for a native trusted application of a trusted execution environment operating system linked with the trusted application development platform and corresponding to the CA, the first access request carries first identification information of the electronic device and second identification information of a bytecode trusted application of any application;

the trusted application development platform is configured to receive the first access request, determine a native trusted application corresponding to the first identification information from native trusted applications respectively corresponding to at least two trusted execution environment operating systems linked with the trusted application development platform according to the first identification information, and send the first access request to the native trusted application corresponding to the first identification information;

the native trusted application corresponding to the first identification information is configured to receive the first access request and determine whether the native trusted application corresponding to the first identification information is installed with a bytecode trusted application with the second identification information, and when the native trusted application corresponding to the first identification information is installed with the bytecode trusted application with the second identification information, return confirmation information to the CA;

the CA is further configured to send a calling command to the native trusted application corresponding to the first identification information after receiving the confirmation information;

the native trusted application corresponding to the first identification information is further configured to forward the calling command received from the CA to the bytecode trusted application with the second identification information.

In some embodiments, the electronic device further includes:

a creating module, configured to create the trusted application development platform based on a bytecode technology supporting a cross-platform function, where the trusted application development platform is linked with native trusted applications respectively corresponding to at least two trusted execution environment operating systems.

In some embodiments, the native trusted application corresponding to the first identification information is further configured to return prompt information of non-installation to the CA when determining that the native trusted application corresponding to the first identification information is not installed with the bytecode trusted application corresponding to the second identification information;

the CA is further configured to send an installation instruction for installing the bytecode trusted application with the second identification information to the native trusted application corresponding to the first identification information;

the native trusted application corresponding to the first identification information is further configured to install the bytecode trusted application with the second identification information at a set position of the native trusted application corresponding to the first identification information according to the installation instruction and based on an open trust protocol, OTRP, and send return information of successful installation to the CA after installation is successful;

the CA is further configured to initiate a second access request after receiving the return information.

In some embodiments, the electronic device further includes: a trusted application management platform;

the CA is further configured to send an installation request for installing the bytecode trusted application with the second identification information to the trusted application management platform;

the trusted application management platform is configured to receive the installation request, assemble an open trust protocol, OTRP, message including installation information of the bytecode trusted application with the second identification information according to the installation request, and send the OTRP message to the CA;

the CA is configured to receive the OTRP message, and send the OTRP message and the installation instruction for installing the bytecode trusted application with the second identification information to the native trusted application corresponding to the first identification information.

In a second aspect, the present application provides a trusted application calling method, the method is applied to a client application, CA, and the method includes:

initiating a first access request for a native trusted application of a trusted execution environment operating system linked with a trusted application development platform and corresponding to the CA, where the first access request carries first identification information of an electronic device to which the CA belongs and second identification information of a bytecode trusted application of any application; enabling the trusted application development platform to receive the first access request, enabling the trusted application development platform to determine a native trusted application corresponding to the first identification information from native trusted applications respectively corresponding to at least two trusted execution environment operating systems linked with the trusted application development platform according to the first identification information, and enabling the trusted application development platform to send the first access request to the native trusted application corresponding to the first identification information;

receiving confirmation information returned by the native trusted application corresponding to the first identification information, where the confirmation information is sent after the native trusted application corresponding to the first identification information receives the first access request and determines that the native trusted application corresponding to the first identification information is installed with a bytecode trusted application with the second identification information;

sending a calling command to the native trusted application corresponding to the first identification information, and enabling the native trusted application corresponding to the first identification information to forward the calling command received from the CA to the bytecode trusted application with the second identification information.

In some embodiments, the method further includes:

sending an installation instruction for installing the bytecode trusted application with the second identification information to the native trusted application corresponding to the first identification information when receiving prompt information of non-installation returned by the native trusted application corresponding to the first identification information; enabling the native trusted application corresponding to the first identification information to install the bytecode trusted application with the second identification information at a set position of the native trusted application corresponding to the first identification information according to the installation instruction and based on an open trust protocol, OTRP;

receiving return information sent by the native trusted application corresponding to the first identification information, and initiating a second access request, where the return information is sent after the native trusted application corresponding to the first identification information is successfully installed with the bytecode trusted application with the second identification information.

In some embodiments, after receiving the prompt information of non-installation returned by the native trusted application corresponding to the first identification information and before sending the installation instruction for installing the bytecode trusted application with the second identification information to the native trusted application corresponding to the first identification information, the method further includes:

sending an installation request for installing the bytecode trusted application with the second identification information to a trusted application management platform;

receiving an open trust protocol, OTRP, message sent by the trusted application management platform and including installation information of the bytecode trusted application with the second identification information, where the OTRP message is sent after the trusted application management platform receives the installation request and successfully assembles the OTRP message according to the installation request;

the sending the installation instruction for installing the bytecode trusted application with the second identification information to the native trusted application corresponding to the first identification information includes:

sending the OTRP message and the installation instruction for installing the bytecode trusted application with the second identification information to the native trusted application corresponding to the first identification information.

In a third aspect, the present application provides a trusted application calling method, the method is applied to a native trusted application, and the method includes:

receiving a first access request, where the first access request carries first identification information of an electronic device and second identification information of a bytecode trusted application of any application;

determining whether a bytecode trusted application with the second identification information is installed, and when the bytecode trusted application with the second identification information is installed, returning confirmation information to a CA;

receiving a calling command sent by the CA, where the calling command is a command sent by the CA to the native trusted application corresponding to the first identification information after the CA receives the confirmation information;

forwarding the calling command received from the CA to the bytecode trusted application with the second identification information.

In some embodiments, the method further includes:

when determining that the bytecode trusted application with the second identification information is not installed, returning prompt information of non-installation to the CA, and enabling the CA to send an installation instruction for installing the bytecode trusted application with the second identification information to the native trusted application corresponding to the first identification information;

receiving the installation instruction, and installing the bytecode trusted application with the second identification information at a set position of the native trusted application corresponding to the first identification information according to the installation instruction and based on an open trust protocol, OTRP; sending return information of successful installation to the CA after installation is successful; and enabling the CA to initiate a second access request after receiving the return information.

In a fourth aspect, the present application provides a trusted application calling apparatus, and the apparatus is applied to a client application, CA, the apparatus includes:

an initiating module, configured to initiate a first access request for a native trusted application of a trusted execution environment operating system linked with a trusted application development platform and corresponding to the CA, where the first access request carries first identification information of an electronic device to which the CA belongs and second identification information of a bytecode trusted application of any application; enable the trusted application development platform to receive the first access request, enable the trusted application development platform to determine a native trusted application corresponding to the first identification information from native trusted applications respectively corresponding to at least two trusted execution environment operating systems linked with the trusted application development platform according to the first identification information, and enable the trusted application development platform to send the first access request to the native trusted application corresponding to the first identification information;

a first receiving module, configured to receive confirmation information returned by the native trusted application corresponding to the first identification information, where the confirmation information is sent after the native trusted application corresponding to the first identification information receives the first access request and determines that the native trusted application corresponding to the first identification information is installed with a bytecode trusted application with the second identification information;

a command sending module, configured to send a calling command to the native trusted application corresponding to the first identification information, and enable the native trusted application corresponding to the first identification information to forward the calling command received from the CA to the bytecode trusted application with the second identification information.

In some embodiments, the apparatus further includes:

an installation instruction sending module, configured to send an installation instruction for installing the bytecode trusted application with the second identification information to the native trusted application corresponding to the first identification information when receiving prompt information of non-installation returned by the native trusted application corresponding to the first identification information; enable the native trusted application corresponding to the first identification information to install the bytecode trusted application with the second identification information at a set position of the native trusted application corresponding to the first identification information according to the installation instruction and based on an open trust protocol, OTRP;

the initiating module is further configured to receive return information sent by the native trusted application corresponding to the first identification information, and initiate a second access request, where the return information is sent after the native trusted application corresponding to the first identification information is successfully installed with the bytecode trusted application with the second identification information.

In some embodiments, the installation instruction sending module is further configured to send an installation request for installing the bytecode trusted application with the second identification information to a trusted application management platform; receive an open trust protocol, OTRP, message sent by the trusted application management platform and including installation information of the bytecode trusted application with the second identification information, where the OTRP message is sent after the trusted application management platform receives the installation request and successfully assembles the OTRP message according to the installation request; and send the OTRP message and the installation instruction for installing the bytecode trusted application with the second identification information to the native trusted application corresponding to the first identification information.

In a fifth aspect, the present application provides a trusted application calling apparatus, and the apparatus is applied to a native trusted application, the apparatus includes:

a second receiving module, configured to receive a first access request, where the first access request carries first identification information of an electronic device and second identification information of a bytecode trusted application of any application;

a determining module, configured to determine whether a bytecode trusted application with the second identification information is installed, and when the bytecode trusted application with the second identification information is installed, return confirmation information to a CA;

a third receiving module, configured to receive a calling command sent by the CA, where the calling command is a command sent by the CA to the native trusted application corresponding to the first identification information after the CA receives the confirmation information;

a forwarding module, configured to forward the calling command received from the CA to the bytecode trusted application with the second identification information.

In some embodiments, the apparatus further includes:

a prompt module, configured to when determining that the bytecode trusted application with the second identification information is not installed, return prompt information of non-installation to the CA, and enable the CA to send an installation instruction for installing the bytecode trusted application with the second identification information to the native trusted application corresponding to the first identification information;

an installation module, configured to receive the installation instruction, and install the bytecode trusted application with the second identification information at a set position of the native trusted application corresponding to the first identification information according to the installation instruction and based on an open trust protocol, OTRP; send return information of successful installation to the CA after installation is successful; and enable the CA to initiate a second access request after receiving the return information.

In a sixth aspect, the present application provides an electronic device, the electronic device includes at least a processor and a memory, where the processor is configured to implement steps of any of the above trusted application calling method when executing a computer program stored in the memory.

In a seventh aspect, the present application provides a computer-readable storage medium, the computer-readable storage medium stores a computer program, the computer program, when executed by a processor, implement steps of any of the above trusted application calling method.

According to the present application, after the CA initiates the first access request, the trusted application development platform may determine the native trusted application corresponding to the first identification information carried in the first access request from native trusted applications respectively corresponding to at least two (a plurality of) TEE OSs linked with the trusted application development platform. The native trusted application corresponding to the first identification information returns confirmation information to the CA when the native trusted application corresponding to the first identification information determines that the native trusted application corresponding to the first identification information is installed with the bytecode trusted application with the second identification information carried in the first access request. The CA may send the calling command to the native trusted application corresponding to the first identification information after receiving the confirmation information. The native trusted application corresponding to the first identification information may forward the calling command received from the CA to the bytecode trusted application with the second identification information, realizing accurate calling of the bytecode trusted application with the second identification information. Because the trusted application development platform of the present application is linked with the native trusted applications respectively corresponding to a plurality of trusted execution environment operating systems, based on the trusted application development platform, the bytecode trusted application can be applicable to any TEE OS, and for different TEE OS hardware platforms, only one corresponding bytecode trusted application needs to be developed for one application. Compared with the related art that for the same application, different versions of trusted applications are developed for different TEE OS hardware platforms, the present application can reduce the development cycle and development cost of the trusted application. Further, the trusted application development platform and the bytecode trusted application developed by the present application may be applied to different TEE OS electronic devices (terminals), so as to achieve the purpose of "one-time development, multi-terminal deployment" and realize the rapid deployment and promotion of applications.

BRIEF DESCRIPTION OF FIGURES

In order to illustrate embodiments of the present application or related art more clearly, accompanying drawings that need to be used in describing embodiments of the present application or related art will be introduced below briefly. Obviously the accompanying drawings described below are only some embodiments of the present application, and other accompanying drawings can also be obtained by those ordinary skilled in the art according to these accompanying drawings.

DETAILED DESCRIPTION

In order to reduce the development cycle and development cost of a trusted application, the present application provides an electronic device, a trusted application calling method, apparatus, device and medium.

In order to make the purpose and embodiments of the present application more clear, embodiments of the present application will be clearly and completely described below in conjunction with the drawings in embodiments of the present application. Obviously, the described embodiments are only a part of embodiments of the present application, but not all embodiments.

It should be noted that the brief description of terms in the present application is only for the convenience of understanding embodiments described next, and is not intended to limit embodiments of the present application. Unless otherwise indicated, these terms should be interpreted according to their ordinary and usual meaning.

Terms "first," "second," "third," and the like in the specification and claims hereof as well as in the foregoing drawings are used to distinguish between like or similar objects or entities and are not necessarily meant to define a particular order or precedence unless otherwise indicated. It is to be understood that the terms so used are interchangeable under appropriate circumstances.

The terms "comprising" and "including" as well as any variations thereof are intended to cover a non-exclusive inclusion, e.g., an article or device that includes a list of components is not necessarily limited to all components expressly listed, but may include other components not expressly listed or inherent to such article or device.

The term "module" refers to any known or later developed hardware, software, firmware, artificial intelligence, fuzzy logic, or combination of hardware and/or software code that performs the functions associated with the module.

Finally, it should be noted that the embodiments are only used to illustrate technical solutions of the present application, not to limit them. Although the present application has been described in detail with reference to the embodiments, those of ordinary skilled in the art should understand that the technical solutions described in the embodiments can still be modified, or some or all of the technical features thereof can be equivalently replaced. These modifications or replacements do not make the essence of the corresponding technical solutions deviate from the scope of the technical solutions of the embodiments of the present application.

Embodiment 1 is as follows.

Figure 1:
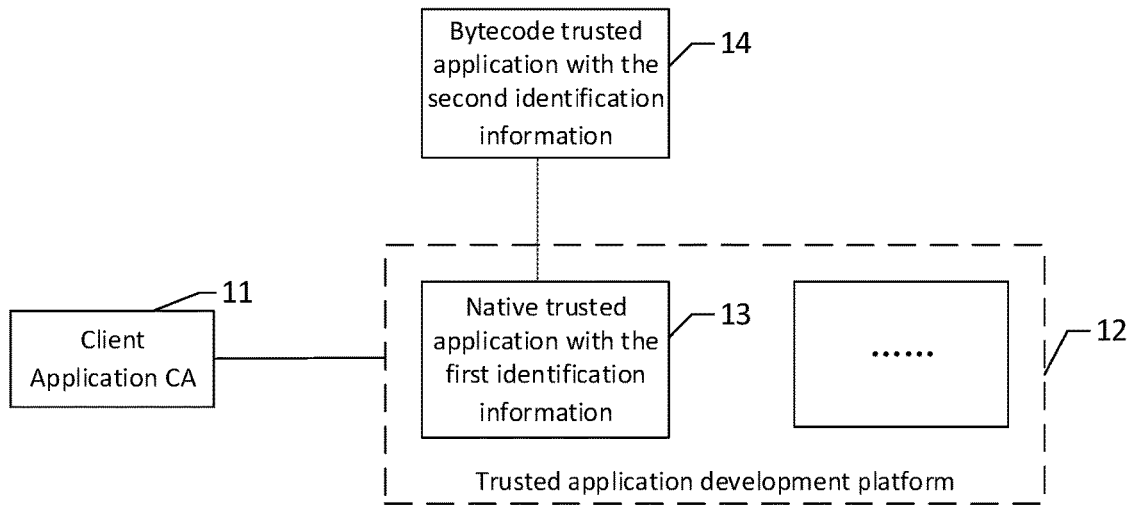
FIG. 1 is a schematic structural diagram of a first kind of electronic device according to some embodiments.

FIG. 1 is a schematic structural diagram of a first kind of electronic device according to some embodiments. The electronic device includes a client application (Client Application, CA) 11 and a trusted application development platform 12.

The CA 11 is configured to initiate a first access request for a native trusted application of a trusted execution environment operating system linked with the trusted application development platform 12 and corresponding to the CA 11. The first access request carries first identification information of the electronic device and second identification information of a Bytecode Trusted Application (BTA) of any application.

The trusted application development platform 12 is configured to receive the first access request, and determine a native trusted application corresponding to the first identification information from native trusted applications respectively corresponding to at least two trusted execution environment operating systems linked with the trusted application development platform 12 according to the first identification information, and send the first access request to the native trusted application corresponding to the first identification information.

The native trusted application 13 corresponding to the first identification information is configured to receive the first access request and determine whether the native trusted application corresponding to the first identification information is installed with BTA 14 with the second identification information, and if the native trusted application corresponding to the first identification information is installed with the BTA 14 with the second identification information, return confirmation information to the CA 11.

The CA 11 is further configured to send a calling command to the native trusted application 13 corresponding to the first identification information after receiving the confirmation information.

The native trusted application 13 corresponding to the first identification information is further configured to forward the calling command received from the CA 11 to the BTA 14 with the second identification information.

In some embodiments, the electronic device of the present application may be a PC, a mobile terminal, or a server. For example, the trusted execution environment operating system (TEE OS) in the electronic device may be any TEE OS such as Huawei iTrustee and Qualcomm QSEE.

In some embodiments, for each TEE OS, a trusted application (referred to as a native trusted application for convenience of description) corresponding to the TEE OS may be created. The creation of the native trusted application corresponding to the TEE OS may adopt the existing technology, which is not described here. In some embodiments, in order to develop a trusted application applicable to a plurality of TEE OSs and used across different TEE OS hardware platforms for any one application, thereby reducing the development cycle and development cost of the trusted application, the electronic device may further include a creating module. The creating module may create a trusted application development platform 12 (trusted application development framework) linked with native trusted applications (referred to as Native TAs for convenience of description) respectively corresponding to a plurality of (at least two) TEE OSs based on a bytecode technology (such as WebAssembly bytecode technology) supporting a cross-platform function. WebAssembly is a new specification developed by a World Wide Web Consortium (W3C) community group including major browser vendors, and defines a new format that is portable, small in size, fast loading, and compatible with the World Wide Web.

Figure 2:
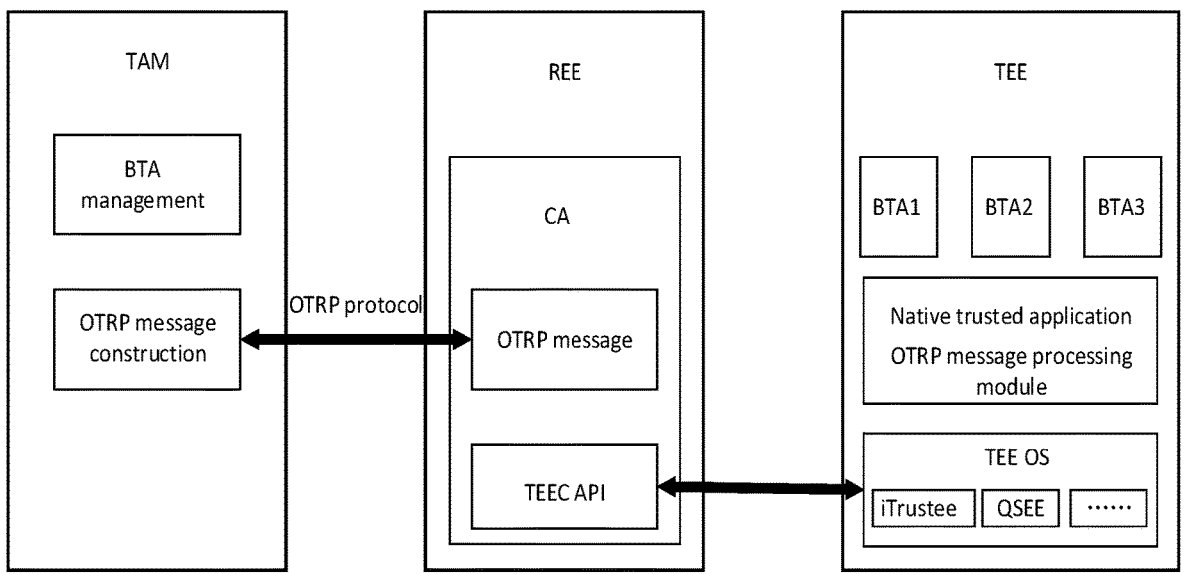
FIG. 2 is a schematic structural diagram of a second kind of electronic device according to some embodiments.

FIG. 2 is a schematic structural diagram of a second kind of electronic device according to some embodiments. Referring to FIG. 2, in the present application, Native TAs respectively corresponding to a plurality of TEE OSs may be constructed into a trusted application development platform 12 based on a bytecode technology (such as WebAssembly bytecode technology) supporting a cross-platform function. The trusted application development platform 12 may provide a unified development interface upwards, so that a trusted application developer does not need to pay attention to the specific version of the TEE OS hardware platform any more, and only needs to develop, for any application such as China Construction Bank, Agricultural Bank, etc., a trusted application (referred to as bytecode trusted application for convenience of description) corresponding to the application. The bytecode trusted application (referred to as Bytecode Trusted Application, BTA, for convenience of description) is a trusted application that is developed based on the trusted application development platform 12, is applicable to different TEE OSs, and may be used across different TEE OS hardware platforms. In the present application, one corresponding trusted application may be developed for each one application. Compared with the related art that for each one application, trusted applications are required to be developed for different TEE OS hardware platforms respectively and a plurality of trusted applications of different versions are required to be developed for the same application, the present application can shorten the development cycle of the trusted application and reduce the development cost of the trusted application, and further, the present application can also achieve the purpose of "one-time development, multi-terminal deployment", so as to realize the rapid deployment and promotion of applications.

In some embodiments, when security functions provided by a Trusted Execution Environment (TEE) need to be used, the client application (CA) 11 in the electronic device may initiate an access request (referred to as a first access request for convenience of description) for the native trusted application of the TEE OS corresponding to the CA 11 included in the trusted application development platform 12. Illustratively, assuming that the TEE OS of the electronic device is a Huawei iTrustee, the CA 11 in the electronic device may initiate a first access request for a native trusted application corresponding to the Huawei iTrustee TEE OS included in the trusted application development platform 12. In some embodiments, the first access request may carry identification information (referred to as first identification information for convenience of description) of the electronic device and identification information (referred to as second identification information for convenience of description) of the bytecode trusted application of any application to be called. The first identification information and the second identification information may be flexibly set as required, which is not specifically limited in the present application. For example, the first identification information of the electronic device may be identification information such as a model number of the electronic device, a brand of the electric device, or the like. In some embodiments, in addition to the identification information such as the model number of the electronic device and the brand of the electronic device, the first identification information may also include the identification information of the native trusted application applicable to the electronic device such as the name of the native trusted application and the version number of the native trusted application. The second identification information of the bytecode trusted application may be identification information such as a name or a vendor name of the bytecode trusted application, or the like.

The CA 11 initiates a first access request. After the trusted application development platform 12 receives the first access request, the trusted application development platform 12 may determine a Native TA corresponding to the first identification information of the electronic device from Native TAs respectively corresponding to at least two (a plurality of) TEE OSs linked with the trusted application development platform 12 according to the first identification information of the electronic device carried in the first access request, and send the first access request to the Native TA corresponding to the first identification information. For example, if the brand of the electronic device is Huawei, the first identification information of the electronic device may include a name and a version number of a native trusted application applicable to an electronic device (terminal) of Huawei or Huawei brand. The trusted application development platform 12 may determine the native trusted application corresponding to the Huawei iTrustee TEE OS as the native trusted application corresponding to the first identification information.

In some embodiments, the native trusted applications respectively corresponding to the plurality of (at least two) TEE OSs may be directly integrated into the trusted application development platform 12, and the trusted application development platform 12 includes (links) the native trusted applications respectively corresponding to the plurality of TEE OSs. In some embodiments, it is considered that the trusted application development platform 12 may occupy a large space if the native trusted applications respectively corresponding to a plurality of TEE OSs are all integrated in the trusted application development platform 12. In order to save space, the trusted application development platform 12 may only include (link) identification information of the native trusted applications respectively corresponding to the plurality of TEE OSs. After the trusted application development platform 12 determines the identification information of the native trusted application corresponding to the first identification information of the electronic device according to a mapping relationship between the identification information of the electronic device and identification information of the native trusted application, the trusted application development platform 12 may download and install the native trusted application corresponding to the first identification information into the trusted application development platform 12 from a backend application platform linked with the trusted application development platform 12 through an over-the-air (OTA) technology. In some embodiments, after the trusted application development platform 12 includes the native trusted application corresponding to the first identification information, the trusted application development platform 12 may send the first access request to the native trusted application (Native TA) corresponding to the first identification information.

In some embodiments, since the bytecode trusted application (BTA) may be installed at a set position such as a data region of the Native TA, after the Native TA 13 with the first identification information receives the first access request, the Native TA 13 with the first identification information may determine whether the Native TA 13 with the first identification information itself is installed with the BTA with the second identification information. If the BTA with the second identification information is installed in the Native TA 13 with the first identification information, BTA calling may be considered to be achieved by sending a calling command to the BTA with the second identification information. In some embodiments, the Native TA 13 with the first identification information may return confirmation information to the CA 11 so that the CA 11 may know that the CA 11 may then send a calling command or the like.

In some embodiments, after receiving the confirmation information returned by the Native TA 13 with the first identification information, the CA 11 may send a calling command to the Native TA 13 with the first identification information. After receiving the calling command sent by the CA 11, the Native TA 13 with the first identification information may forward (for example, pass-through) the calling command to the BTA with the second identification information. After receiving the calling command, the BTA with the second identification information may execute the corresponding operation according to the calling command. The calling command may be flexibly set as required, which is not specifically limited in the present application.

Because the trusted application development platform 12 of the present application links the native trusted applications respectively corresponding to the plurality of trusted execution environment operating systems, based on the trusted application development platform 12, the bytecode trusted application can be applied to any TEE OS, and only one corresponding bytecode trusted application needs to be developed for one application for different TEE OS hardware platforms. Compare with the related art that for a same one application, different versions of trusted applications need to be developed for different TEE OS hardware platforms, the present application can reduce the development cycle and development cost of the trusted application. Further, the trusted application development platform 12 and the bytecode trusted application developed in the present application can be applied to different electronic devices (terminals) of the TEE OSs, so as to achieve the purpose of "one-time development, multi-terminal deployment" and realize the rapid deployment and promotion of applications.

Embodiment 2 is as follows.

In order to accurately install the bytecode trusted application corresponding to the second identification information, on the basis of the foregoing embodiments, in some embodiments of the present application, the native trusted application 13 corresponding to the first identification information is further configured to return prompt information of non-installation to the CA 11 when determining that the native trusted application 13 corresponding to the first identification information is not installed with the BTA 14 with the second identification information.

The CA 11 is further configured to send an installation instruction for installing the BTA 14 with the second identification information to the native trusted application 13 corresponding to the first identification information.

The native trusted application 13 corresponding to the first identification information is further configured to install the BTA 14 with the second identification information at a set position of the native trusted application 13 corresponding to the first identification information according to the installation instruction based on an open trust protocol (OTRP), and send return information of successful installation to the CA 11 after installation is successful.

The CA 11 is further configured to initiate a second access request after receiving the return information.

In some embodiments, if the Native TA 13 with the first identification information determines that the Native TA 13 with the first identification information is not installed with the BTA with the second identification information, the Native TA 13 may return prompt information of non-installation to the CA 11. The prompt information may be flexibly set as required, which is not specifically limited in the present application. For example, the prompt information returned by the Native TA 13 with the first identification information to the CA 11 may be a preset status value (STATUS_WAIT_TASM_TA).

Referring to FIG. 2, in some embodiments, the electronic device may further include a Trusted Application Management (TAM) platform, and the TAM (application store) may manage a plurality of BTAs. The TAM may include installation information such as installation packages, application signatures, and service provider public key certificates of a plurality of BTAs. After receiving the prompt information, the CA 11 may send an installation request for installing the BTA with the second identification information to the TAM. After receiving the installation request for installing the BTA with the second identification information, the TAM may assemble an Open Trust Protocol (OTRP) message including installation information such as an installation package, an application signature, and a service provider public key certificate of the BTA with the second identification information according to the installation request, and send the OTRP message to the CA 11.

After receiving the OTRP message sent by the TAM, the CA 11 may send the OTRP message and the installation instruction for installing the bytecode trusted application with the second identification information to the Native TA 13 with the first identification information. In some embodiments, the Native TA may include an OTRP message processing module. After the Native TA 13 with the first identification information receives the OTRP message and the installation instruction, the OTRP message processing module in the Native TA 13 with the first identification information may parse the OTRP message based on an open trust protocol, and install the BTA 14 with the second identification information at a set position of the Native TA 13 with the first identification information based on the OTRP. The set position may be flexibly set as required, which is not specifically limited in the present application. For example, the BTA may be installed at a set position such as a data region in the Native TA, and the BTA may run in the Native TA based on a WebAssembly virtual machine.

After the BTA 14 with the second identification information is successfully installed, the Native TA 13 with the first identification information may send return information of successful installation to the CA 11. After receiving the return information sent by the Native TA 13 with the first identification information, the CA 11 may initiate an access request again (referred to as a second access request for convenience of description). In some embodiments, the CA 11 may initiate the second access request by resending a command (CMD_OPEN_WASM_TA_SESSION). The processing of the second access request by the trusted application development platform 12 and the native trusted application 13 corresponding to the first identification information is similar to the processing of the first access request, which is not described herein again.

In the related art, application developers generally need to develop different versions of trusted applications for different TEE OS hardware platforms, and generally only the device manufacturer of the TEE OS hardware platform has the management authority (TEE ownership) over the trusted applications. As a result, application developers need to conduct technical communication with different device manufacturers to distribute signatures for trusted applications corresponding to different TEE OSs, so that trusted applications can run on the corresponding TEE OSs. In the present application, it is only necessary to conduct technical communication with the device manufacturers when creating the Native TAs corresponding to the TEE OSs of the device manufacturers, and it is not necessary to conduct technical communication with the device manufacturers for the BTA developed based on the trusted application development platform 12. According to the present application, under the condition that the application developer does not have the ownership of the TEE, the signature distribution and management can be performed on the BTA undertaking the actual service in the native trusted application based on the TAM, so that the BTA can run on the TEE OS.

Figure 3:
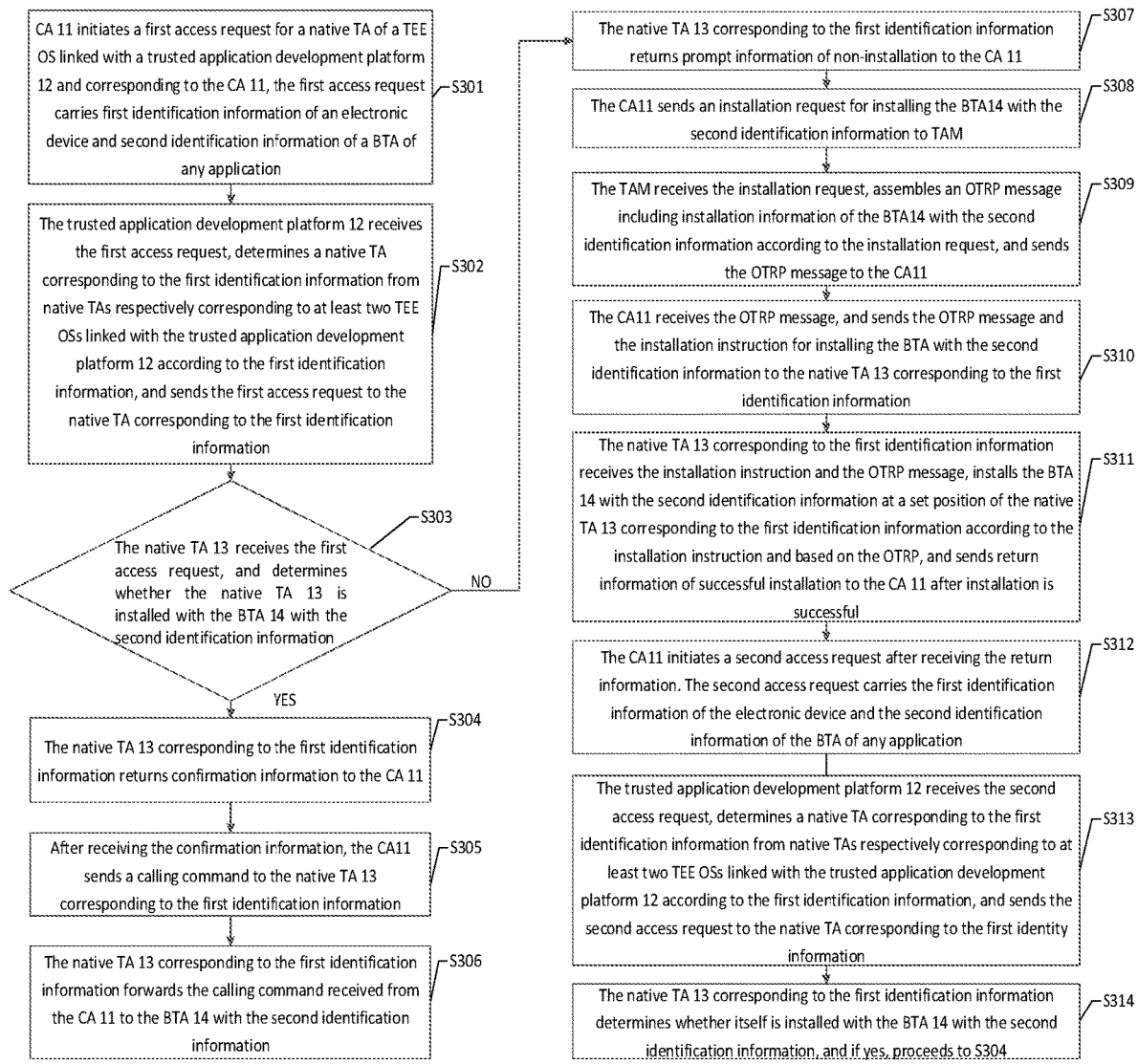
FIG. 3 is a schematic diagram of a first kind of trusted application calling process according to some embodiments.
Figure 4:
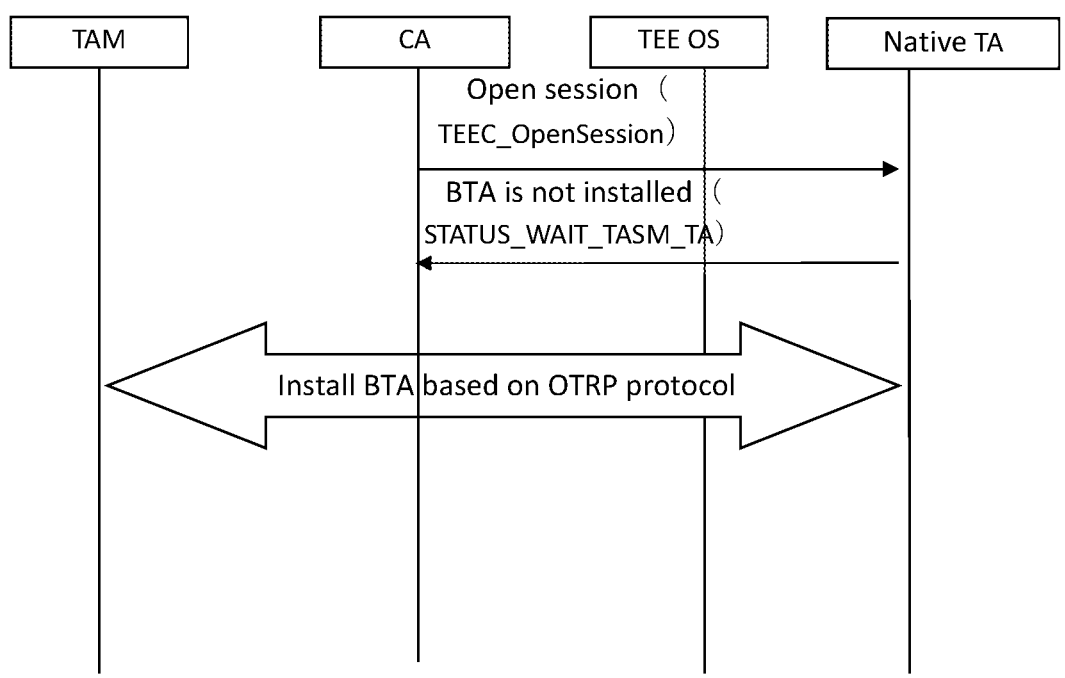
FIG. 4 is a schematic diagram of a second kind of trusted application calling process according to some embodiments.

For the convenience of understanding, the trusted application calling process according to the present application is illustrated in the following through an embodiment. FIG. 3 illustrates a schematic diagram of a first kind of trusted application calling process according to some embodiments, and FIG. 4 illustrates a schematic diagram of a second kind of trusted application calling process according to some embodiments. Referring to FIG. 3 and FIG. 4, the process includes following steps.

S301: a CA 11 initiates a first access request for a native trusted application of a trusted execution environment operating system linked with a trusted application development platform 12 and corresponding to the CA 11, where the first access request carries first identification information of an electronic device and second identification information of a bytecode trusted application of any application.

Referring to FIG. 2 and FIG. 4, in some embodiments, the CA 11 may initiate the first access request by calling an open session function (TEEC_OpenSession). The CA 11 may initiate the first access request based on a TEEC Application Programming Interface (API), and the TEE OS in the electronic device may receive the first access request initiated by the CA 11, and sends the first access request to a trusted application development platform 12.

S302: the trusted application development platform 12 receives the first access request, determines a native trusted application corresponding to the first identification information from native trusted applications respectively corresponding to at least two trusted execution environment operating systems linked with the trusted application development platform 12 according to the first identification information, and sends the first access request to the native trusted application corresponding to the first identification information.

S303: the native trusted application 13 corresponding to the first identification information receives the first access request, and determines whether the native trusted application 13 itself is installed with the BTA 14 with the second identification information, if the native trusted application 13 is installed with the BTA 14 with the second identification information, S304 is performed; if the native trusted application 13 is not installed with the BTA 14 with the second identification information, S307 is performed.

Referring to FIG. 2, for example, the native trusted application 13 corresponding to the first identification information may be installed with a plurality of different BTAs such as BTA1, BTA2, and BTA3.

S304: the native trusted application 13 corresponding to the first identification information returns confirmation information to the CA 11.

S305: after receiving the confirmation information, the CA 11 sends a calling command to the native trusted application 13 corresponding to the first identification information.

S306: the native trusted application 13 corresponding to the first identification information forwards the calling command received from the CA 11 to the BTA 14 with the second identification information.

S307: the native trusted application 13 corresponding to the first identification information returns prompt information of non-installation to the CA 11.

Referring to FIG. 4, the prompt information returned by the Native TA 13 corresponding to the first identification information to the CA 11 may be a preset status value (STATUS_WAIT_TASM_TA).

S308: the CA 11 sends an installation request for installing the BTA 14 with the second identification information to TAM.

S309: the trusted application management platform receives the installation request, assembles an open trust protocol message including installation information of the BTA 14 with the second identification information according to the installation request, and sends the open trust protocol message to the CA 11.

S310: the CA 11 receives the open trust protocol message, and sends the open trust protocol message and the installation instruction for installing the bytecode trusted application with the second identification information to the native trusted application 13 corresponding to the first identification information.

S311: the native trusted application 13 corresponding to the first identification information receives the installation instruction and the open trust protocol message, installs the BTA 14 with the second identification information at a set position of the native trusted application 13 corresponding to the first identification information according to the installation instruction and based on the open trust protocol, and sends return information of successful installation to the CA 11 after installation is successful.

S312: the CA 11 initiates a second access request after receiving the return information. The second access request carries the first identification information of the electronic device and the second identification information of the bytecode trusted application of any application.

S313: the trusted application development platform 12 receives the second access request, determines a native trusted application corresponding to the first identification information from native trusted applications respectively corresponding to at least two trusted execution environment operating systems linked with the trusted application development platform 12 according to the first identification information, and sends the second access request to the native trusted application corresponding to the first identity information.

S314: the native trusted application 13 corresponding to the first identification information determines whether the native trusted application 13 corresponding to the first identification information is installed with the BTA 14 with the second identification information, and if the native trusted application 13 corresponding to the first identification information is installed with the BTA 14 with the second identification information, S304 is performed.

Embodiment 3 is as follows.

Figure 5:
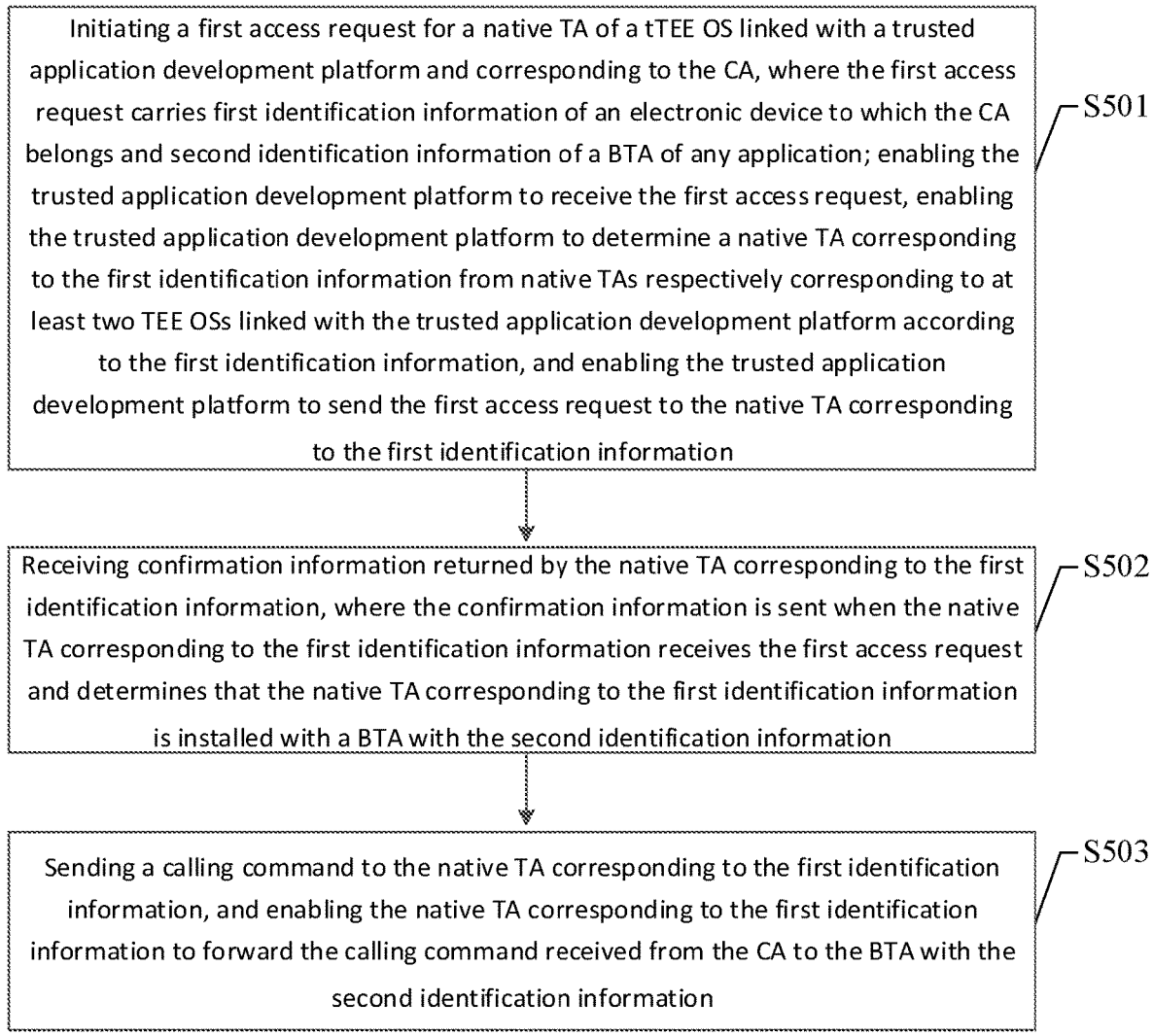
FIG. 5 is a schematic diagram of a third kind of trusted application calling process according to some embodiments.

Based on the same technical concept, the present application provides a trusted application calling method, and the method is applied to a client application (CA). FIG. 5 illustrates a schematic diagram of a third kind of trusted application calling process according to some embodiments. As shown in FIG. 5, the process includes following steps.

S501: initiating a first access request for a native trusted application of a trusted execution environment operating system linked with a trusted application development platform and corresponding to the CA, where the first access request carries first identification information of an electronic device to which the CA belongs and second identification information of a bytecode trusted application of any application; enabling the trusted application development platform to receive the first access request, enabling the trusted application development platform to determine a native trusted application corresponding to the first identification information from native trusted applications respectively corresponding to at least two trusted execution environment operating systems linked with the trusted application development platform according to the first identification information, and enabling the trusted application development platform to send the first access request to the native trusted application corresponding to the first identification information.

S502: receiving confirmation information returned by the native trusted application corresponding to the first identification information, where the confirmation information is sent by the native trusted application corresponding to the first identification information when the native trusted application corresponding to the first identification information receives the first access request and determines that the native trusted application corresponding to the first identification information is installed with a bytecode trusted application with the second identification information.

S503: sending a calling command to the native trusted application corresponding to the first identification information, and enabling the native trusted application corresponding to the first identification information to forward the calling command received from the CA to the bytecode trusted application with the second identification information.

In some embodiments, the method further includes:
sending an installation instruction for installing the bytecode trusted application with the second identification information to the native trusted application corresponding to the first identification information when receiving prompt information of non-installation returned by the native trusted application corresponding to the first identification information; enabling the native trusted application corresponding to the first identification information to install the bytecode trusted application with the second identification information at a set position of the native trusted application corresponding to the first identification information according to the installation instruction and based on an open trust protocol, OTRP;

receiving return information sent by the native trusted application corresponding to the first identification information, and initiating a second access request, where the return information is sent after the native trusted application corresponding to the first identification information is successfully installed with the bytecode trusted application with the second identification information.

In some embodiments, after receiving the prompt information returned by the native trusted application corresponding to the first identification information and before sending the installation instruction for installing the bytecode trusted application with the second identification information to the native trusted application corresponding to the first identification information, the method further includes:
sending an installation request for installing the bytecode trusted application with the second identification information to a trusted application management platform;
receiving an open trust protocol, OTRP, message sent by the trusted application management platform and including installation information of the bytecode trusted application with the second identification information, where the OTRP message is sent after the trusted application management platform receives the installation request and successfully assembles the OTRP message according to the installation request.

The sending the installation instruction for installing the bytecode trusted application with the second identification information to the native trusted application corresponding to the first identification information includes:
sending the OTRP message and the installation instruction for installing the bytecode trusted application with the second identification information to the native trusted application corresponding to the first identification information.

According to the present application, after the CA initiates the first access request, the trusted application development platform may determine the native trusted application corresponding to the first identification information of the electronic device carried in the first access request from native trusted applications respectively corresponding to at least two (a plurality of) TEE OSs linked with the trusted application development platform. The native trusted application corresponding to the first identification information returns confirmation information to the CA when the native trusted application corresponding to the first identification information determines that the native trusted application corresponding to the first identification information is installed with the bytecode trusted application with the second identification information carried in the first access request. The CA may send the calling command to the native trusted application corresponding to the first identification information after receiving the confirmation information. The native trusted application corresponding to the first identification information may forward the calling command received from the CA to the bytecode trusted application with the second identification information, realizing accurate calling of the bytecode trusted application with the second identification information. Because the trusted application development platform of the present application is linked with the native trusted applications respectively corresponding to a plurality of trusted execution environment operating systems, based on the trusted application development platform, the bytecode trusted application can be applicable to any TEE OS, and for different TEE OS hardware platforms, only one corresponding bytecode trusted application needs to be developed for one application. Compared with the related art that for the same application, different versions of trusted applications are needed to be developed for different TEE OS hardware platforms, the present application can reduce the development cycle and development cost of the trusted application. Further, the trusted application development platform and the bytecode trusted application developed by the present application may be applied to different TEE OS electronic devices (terminals), so as to achieve the purpose of "one-time development, multi-terminal deployment" and realize the rapid deployment and promotion of applications.

Embodiment 4 is as follows.

Figure 6:
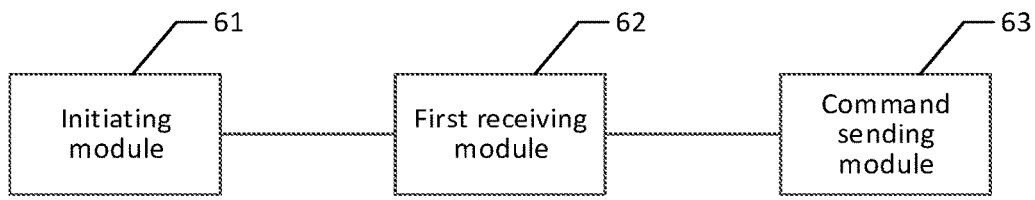
FIG. 6 is a schematic diagram of a first kind of trusted application calling apparatus according to some embodiments.

Based on the same technical concept, the present application provides a trusted application calling apparatus, and the apparatus is applied to a client application (CA). FIG. 6 illustrates a schematic diagram of a first kind of trusted application calling apparatus according to some embodiments. As shown in FIG. 6, the apparatus includes:
an initiating module 61, configured to initiate a first access request for a native trusted application of a trusted execution environment operating system linked with a trusted application development platform and corresponding to the CA, where the first access request carries first identification information of an electronic device to which the CA belongs and second identification information of a bytecode trusted application of any application; enable the trusted application development platform to receive the first access request, enable the trusted application development platform to determine a native trusted application corresponding to the first identification information from native trusted applications respectively corresponding to at least two trusted execution environment operating systems linked with the trusted application development platform according to the first identification information, and enable the trusted application development platform to send the first access request to the native trusted application corresponding to the first identification information;
a first receiving module 62, configured to receive confirmation information returned by the native trusted application corresponding to the first identification information, where the confirmation information is sent after the native trusted application corresponding to the first identification information receives the first access request and determines that the native trusted application corresponding to the first identification information is installed with a bytecode trusted application with the second identification information;
a command sending module 63, configured to send a calling command to the native trusted application corresponding to the first identification information, and enable the native trusted application corresponding to the first identification information to forward the calling command received from the CA to the bytecode trusted application with the second identification information.

In some embodiments, the apparatus further includes:
an installation instruction sending module, configured to send an installation instruction for installing the bytecode trusted application with the second identification information to the native trusted application corresponding to the first identification information when receiving prompt information of non-installation returned by the native trusted application corresponding to the first identification information; enable the native trusted application corresponding to the first identification information to install the bytecode trusted application with the second identification information at a set position of the native trusted application corresponding to the first identification information according to the installation instruction and based on an open trust protocol, OTRP;
the initiating module 61 is further configured to receive return information sent by the native trusted application corresponding to the first identification information, and initiate a second access request, where the return information is sent after the native trusted application corresponding to the first identification information is successfully installed with the bytecode trusted application with the second identification information.

In some embodiments, the installation instruction sending module is further configured to send an installation request for installing the bytecode trusted application with the second identification information to a trusted application management platform; receive an open trust protocol, OTRP, message sent by the trusted application management platform and including installation information of the bytecode trusted application with the second identification information, where the OTRP message is sent after the trusted application management platform receives the installation request and successfully assembles the OTRP message according to the installation request; and send the OTRP message and the installation instruction for installing the bytecode trusted application with the second identification information to the native trusted application corresponding to the first identification information.

Embodiment 5 is as follows.

Figure 7:
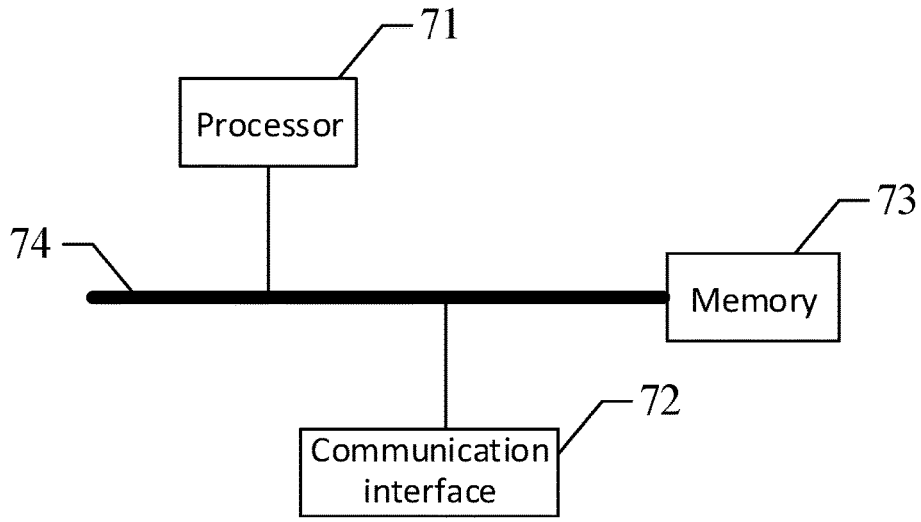
FIG. 7 is a schematic structural diagram of a third kind of electronic device according to some embodiments.

Based on the same technical concept, the present application further provides an electronic device, and FIG. 7 illustrates a schematic structural diagram of a third kind of electronic device according to some embodiments. As shown in FIG. 7, the electronic device includes a processor 71, a communication interface 72, a memory 73 and a communication bus 74, where the processor 71, the communication interface 72 and the memory 73 communicate with each other through the communication bus 74.

The memory 73 stores a computer program, the program, when executed by the processor 71, causes the processor 71 to perform following steps:

initiating a first access request for a native trusted application of a trusted execution environment operating system linked with a trusted application development platform and corresponding to the CA, where the first access request carries first identification information of an electronic device to which the CA belongs and second identification information of a bytecode trusted application of any application; enabling the trusted application development platform to receive the first access request, enabling the trusted application development platform to determine a native trusted application corresponding to the first identification information from native trusted applications respectively corresponding to at least two trusted execution environment operating systems linked with the trusted application development platform according to the first identification information, and enabling the trusted application development platform to send the first access request to the native trusted application corresponding to the first identification information;

receiving confirmation information returned by the native trusted application corresponding to the first identification information, where the confirmation information is sent after the native trusted application corresponding to the first identification information receives the first access request and determines that the native trusted application corresponding to the first identification information is installed with a bytecode trusted application with the second identification information;

sending a calling command to the native trusted application corresponding to the first identification information, and enabling the native trusted application corresponding to the first identification information to forward the calling command received from the CA to the bytecode trusted application with the second identification information.

In some embodiments, the processor 71 is further configured to send an installation instruction for installing the bytecode trusted application with the second identification information to the native trusted application corresponding to the first identification information when receiving prompt information of non-installation returned by the native trusted application corresponding to the first identification information; enable the native trusted application corresponding to the first identification information to install the bytecode trusted application with the second identification information at a set position of the native trusted application corresponding to the first identification information according to the installation instruction and based on an open trust protocol, OTRP;

receive return information sent by the native trusted application corresponding to the first identification information, and initiate a second access request, where the return information is sent after the native trusted application corresponding to the first identification information is successfully installed with the bytecode trusted application with the second identification information.

In some embodiments, the processor 71 is further configured to send an installation request for installing the bytecode trusted application with the second identification information to a trusted application management platform; receive an open trust protocol, OTRP, message sent by the trusted application management platform and including installation information of the bytecode trusted application with the second identification information, where the OTRP message is sent after the trusted application management platform receives the installation request and successfully assembles the OTRP message according to the installation request; and send the OTRP message and the installation instruction for installing the bytecode trusted application with the second identification information to the native trusted application corresponding to the first identification information.

Since the principle for solving the problem of the above electronic device is similar to that of the trusted application calling method, the implementation of the above electronic device can be referred to the implementation of the method, and repetition is not repeated.

The communication bus mentioned above for the electronic device may be a Peripheral Component Interconnect (PCI) bus or an Extended Industry Standard Architecture (EISA) bus, etc. The communication bus may be divided into an address bus, a data bus, a control bus and the like. Only one bold line is shown for ease of illustration, but it does not indicate that there is only one bus or one type of bus.

The communication interface 72 is used for communication between the electronic device described above and other devices.

The memory may include Random Access Memory (RAM), and may also include Non-Volatile Memory (NVM), such as at least one disk memory. Alternatively, the memory may also be at least one storage device located remotely from the aforementioned processor.

The processor may be a general-purpose processor, including a central processing unit, a Network Processor (NP), etc; and may also be a Digital Signal Processing (DSP), an application specific integrated circuit, a field programmable gate array or other programmable logic device, a discrete gate or transistor logic device, discrete hardware components, and the like.

Embodiment 6 is as follows.

Based on the same technical concept, embodiments of the present application provide a computer-readable storage medium. The computer-readable storage medium stores a computer program executable by an electronic device, and the program, when run on the electronic device, causes the electronic device to perform following steps:

initiating a first access request for a native trusted application of a trusted execution environment operating system linked with a trusted application development platform and corresponding to the CA, where the first access request carries first identification information of an electronic device to which the CA belongs and second identification information of a bytecode trusted application of any application; enabling the trusted application development platform to receive the first access request, enabling the trusted application development platform to determine a native trusted application corresponding to the first identification information from native trusted applications respectively corresponding to at least two trusted execution environment operating systems linked with the trusted application development platform according to the first identification information, and enabling the trusted application development platform to send the first access request to the native trusted application corresponding to the first identification information;

receiving confirmation information returned by the native trusted application corresponding to the first identification information, where the confirmation information is sent after the native trusted application corresponding to the first identification information receives the first access request and determines that the native trusted application corresponding to the first identification information is installed with a bytecode trusted application with the second identification information;

sending a calling command to the native trusted application corresponding to the first identification information, and enabling the native trusted application corresponding to the first identification information to forward the calling command received from the CA to the bytecode trusted application with the second identification information.

In some embodiments, the method further includes:

sending an installation instruction for installing the bytecode trusted application with the second identification information to the native trusted application corresponding to the first identification information when receiving prompt information of non-installation returned by the native trusted application corresponding to the first identification information; enabling the native trusted application corresponding to the first identification information to install the bytecode trusted application with the second identification information at a set position of the native trusted application corresponding to the first identification information according to the installation instruction and based on an open trust protocol, OTRP;

receiving return information sent by the native trusted application corresponding to the first identification information, and initiating a second access request, where the return information is sent after the native trusted application corresponding to the first identification information is successfully installed with the bytecode trusted application with the second identification information.

In some embodiments, after receiving the prompt information returned by the native trusted application corresponding to the first identification information and before sending the installation instruction for installing the bytecode trusted application with the second identification information to the native trusted application corresponding to the first identification information, the method further includes:

sending an installation request for installing the bytecode trusted application with the second identification information to a trusted application management platform;

receiving an open trust protocol, OTRP, message sent by the trusted application management platform and including installation information of the bytecode trusted application with the second identification information, where the OTRP message is sent after the trusted application management platform receives the installation request and successfully assembles the OTRP message according to the installation request.

The sending the installation instruction for installing the bytecode trusted application with the second identification information to the native trusted application corresponding to the first identification information includes:

sending the OTRP message and the installation instruction for installing the bytecode trusted application with the second identification information to the native trusted application corresponding to the first identification information.

Since the principle of solving the problem by the above computer-readable storage medium is similar to that of the trusted application calling method, the implementation of the above computer-readable storage medium can be referred to the implementation of the method, and repetition is not repeated.

The computer-readable storage medium described above may be any available medium or data storage device that can be accessed by a processor in an electronic device, includes but not limited to, magnetic memory such as floppy disk, hard disk, magnetic tape, magneto-optical disk (MO), etc., optical memory such as CD, DVD, BD, HVD, etc., and semiconductor memory such as ROM, EPROM, EEPROM, non-volatile memory (NAND FLASH), solid state disk (SSD), etc.

Embodiment 7 is as follows.

Figure 8:
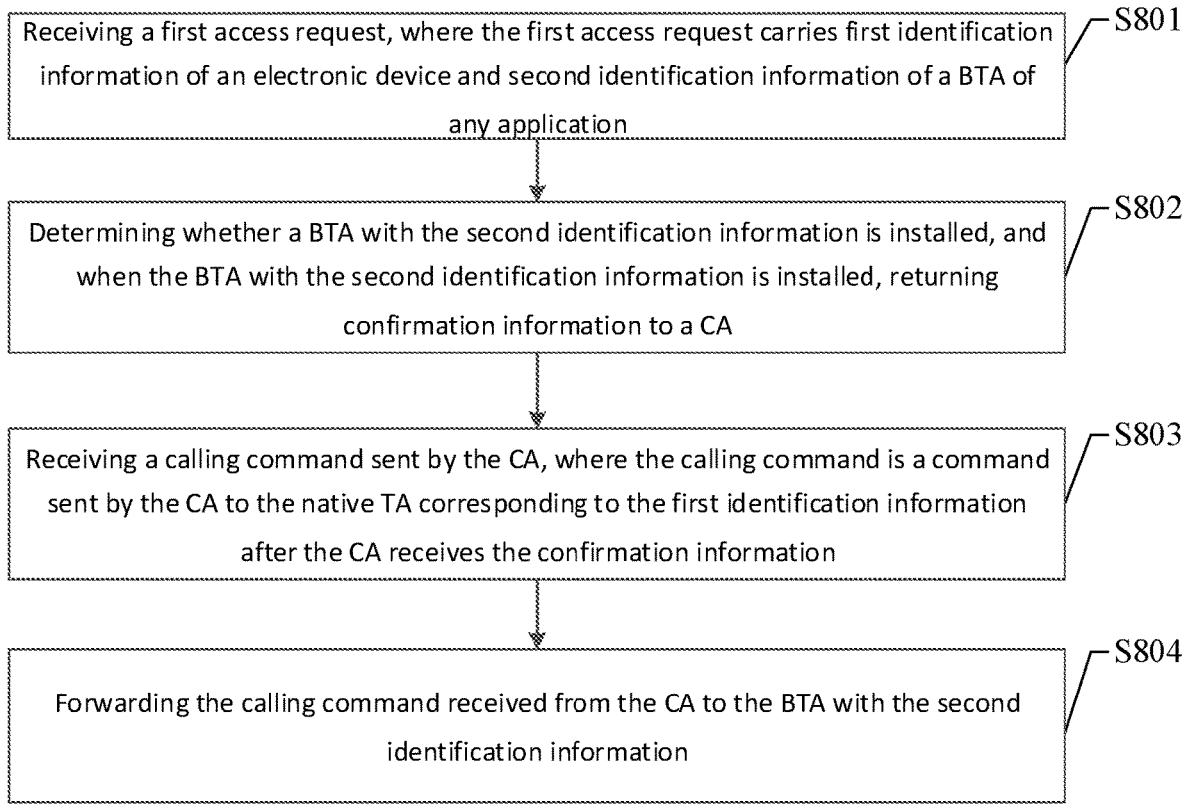
FIG. 8 is a schematic diagram of a fourth kind of trusted application calling process according to some embodiments.

Based on the same technical concept, the present application provides a trusted application calling method, and the method is applied to a native trusted application. FIG. 8 illustrates a fourth kind of trusted application calling process according to some embodiments, and as shown in FIG. 8, the process includes following steps.

S801: receiving a first access request, where the first access request carries first identification information of an electronic device and second identification information of a bytecode trusted application of any application.

S802: determining whether a bytecode trusted application with the second identification information is installed in the native trusted application, and when the bytecode trusted application with the second identification information is installed, returning confirmation information to a CA.

S803: receiving a calling command sent by the CA, where the calling command is a command sent by the CA to the native trusted application corresponding to the first identification information after the CA receives the confirmation information.

S804: forwarding the calling command received from the CA to the bytecode trusted application with the second identification information.

In some embodiments, the method further includes:
when determining that the bytecode trusted application with the second identification information is not installed in the native trusted application, returning prompt information of non-installation to the CA, and enabling the CA to send an installation instruction for installing the bytecode trusted application with the second identification information to the native trusted application corresponding to the first identification information;
receiving the installation instruction, and installing the bytecode trusted application with the second identification information at a set position of the native trusted application corresponding to the first identification information according to the installation instruction and based on an open trust protocol, OTRP; sending return information of successful installation to the CA after installation is successful; and enabling the CA to initiate a second access request after receiving the return information.

According to the present application, after the CA initiates the first access request, the trusted application development platform may determine the native trusted application corresponding to the first identification information carried in the first access request from native trusted applications respectively corresponding to at least two (a plurality of) TEE OSs linked with the trusted application development platform. The native trusted application corresponding to the first identification information returns confirmation information to the CA when the native trusted application corresponding to the first identification information determines that the native trusted application corresponding to the first identification information is installed with the bytecode trusted application with the second identification information carried in the first access request. The CA may send the calling command to the native trusted application corresponding to the first identification information after receiving the confirmation information. The native trusted application corresponding to the first identification information may forward the calling command received from the CA to the bytecode trusted application with the second identification information, realizing accurate calling of the bytecode trusted application with the second identification information. Because the trusted application development platform of the present application is linked with the native trusted applications respectively corresponding to a plurality of trusted execution environment operating systems, based on the trusted application development platform, the bytecode trusted application can be applicable to any TEE OS, and for different TEE OS hardware platforms, only one corresponding bytecode trusted application needs to be developed for one application. Compared with the related art that for the same application, different versions of trusted applications are developed for different TEE OS hardware platforms, the present application can reduce the development cycle and development cost of the trusted application. Further, the trusted application development platform and the bytecode trusted application developed by the present application may be applied to different TEE OS electronic devices (terminals), so as to achieve the purpose of "one-time development, multi-terminal deployment" and realize the rapid deployment and promotion of applications.

Embodiment 8 is as follows.

Figure 9:
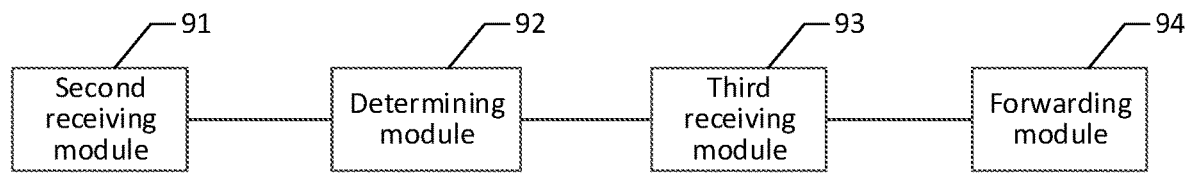
FIG. 9 is a schematic diagram of a second kind of trusted application calling apparatus according to some embodiments.

Based on the same technical concept, the present application provides a trusted application calling apparatus, and the apparatus is applied to a native trusted application (a native trusted application corresponding to first identification information of an electronic device). FIG. 9 illustrates a schematic diagram of a second kind of trusted application calling apparatus according to some embodiments. As shown in FIG. 9, the apparatus includes:
a second receiving module 91, configured to receive a first access request, where the first access request carries first identification information of the electronic device and second identification information of a bytecode trusted application of any application;
a determining module 92, configured to determine whether a bytecode trusted application with the second identification information is installed, and when the bytecode trusted application with the second identification information is installed, return confirmation information to a CA;
a third receiving module 93, configured to receive a calling command sent by the CA, where the calling command is a command sent by the CA to the native trusted application corresponding to the first identification information after the CA receives the confirmation information;
a forwarding module 94, configured to forward the calling command received from the CA to the bytecode trusted application with the second identification information.

In some embodiments, the apparatus further includes:
a prompt module, configured to when determining that the bytecode trusted application with the second identification information is not installed, return prompt information of non-installation to the CA, and enable the CA to send an installation instruction for installing the bytecode trusted application with the second identification information to the native trusted application corresponding to the first identification information;
an installation module, configured to receive the installation instruction, and install the bytecode trusted application with the second identification information at a set position of the native trusted application corresponding to the first identification information according to the installation instruction and based on an open trust protocol, OTRP; send return information of successful installation to the CA after installation is successful; and enable the CA to initiate a second access request after receiving the return information.

Embodiment 9 is as follows.

Figure 10:
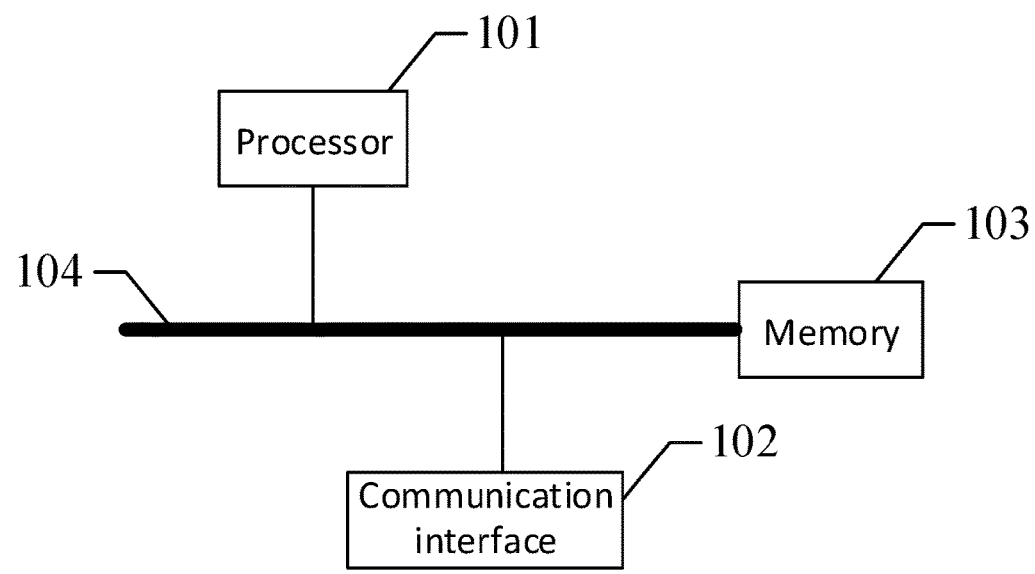
FIG. 10 is a schematic structural diagram of a fourth kind of electronic device according to some embodiments.

Based on the same technical concept, the present application further provides an electronic device, and FIG. 10 illustrates a schematic structural diagram of a fourth kind of electronic device according to some embodiments. As shown in FIG. 10, the electronic device includes a processor 101, a communication interface 102, a memory 103 and a communication bus 104, where the processor 101, the communication interface 102 and the memory 103 communicate with each other through the communication bus 104.

The memory 103 stores a computer program, the program, when executed by the processor 101, causes the processor 101 to perform following steps:
receiving a first access request, where the first access request carries first identification information of an electronic device and second identification information of a bytecode trusted application of any application;
determining whether a bytecode trusted application with the second identification information is installed, and when the bytecode trusted application with the second identification information is installed, returning confirmation information to a CA;

receiving a calling command sent by the CA, where the calling command is a command sent by the CA to the native trusted application corresponding to the first identification information after the CA receives the confirmation information;

forwarding the calling command received from the CA to the bytecode trusted application with the second identification information.

In some embodiments, the processor is further configured to when determining that the bytecode trusted application with the second identification information is not installed, return prompt information of non-installation to the CA, and enable the CA to send an installation instruction for installing the bytecode trusted application with the second identification information to the native trusted application corresponding to the first identification information;

receive the installation instruction, and install the bytecode trusted application with the second identification information at a set position of the native trusted application corresponding to the first identification information according to the installation instruction and based on an open trust protocol, OTRP; send return information of successful installation to the CA after installation is successful; and enable the CA to initiate a second access request after receiving the return information.

Since the principle for solving the problem of the above electronic device is similar to that of the trusted application calling method, the implementation of the above electronic device can be referred to the implementation of the method, and repetition is not repeated.

The communication bus mentioned above for the electronic device may be a Peripheral Component Interconnect (PCI) bus or an Extended Industry Standard Architecture (EISA) bus, etc. The communication bus may be divided into an address bus, a data bus, a control bus and the like. Only one bold line is shown for ease of illustration, but it does not indicate that there is only one bus or one type of bus.

The communication interface 102 is used for communication between the electronic device described above and other devices.

The memory may include Random Access Memory (RAM), and may also include Non-Volatile Memory (NVM), such as at least one disk memory. Alternatively, the memory may also be at least one storage device located remotely from the aforementioned processor.

The processor may be a general-purpose processor, including a central processing unit, a Network Processor (NP), etc; and may also be a Digital Signal Processing (DSP), an application specific integrated circuit, a field programmable gate array or other programmable logic device, a discrete gate or transistor logic device, discrete hardware components, and the like.

Embodiment 10 is as follows.

Based on the same technical concept, embodiments of the present application provide a computer-readable storage medium. The computer-readable storage medium stores a computer program executable by an electronic device, and the program, when run on the electronic device, causes the electronic device to perform following steps:

receiving a first access request, where the first access request carries first identification information of an electronic device and second identification information of a bytecode trusted application of any application;

determining whether a bytecode trusted application with the second identification information is installed, and when the bytecode trusted application with the second identification information is installed, returning confirmation information to a CA;

receiving a calling command sent by the CA, where the calling command is a command sent by the CA to the native trusted application corresponding to the first identification information after the CA receives the confirmation information;

forwarding the calling command received from the CA to the bytecode trusted application with the second identification information.

In some embodiments, the method further includes:

when determining that the bytecode trusted application with the second identification information is not installed, returning prompt information of non-installation to the CA, and enabling the CA to send an installation instruction for installing the bytecode trusted application with the second identification information to the native trusted application corresponding to the first identification information;

receiving the installation instruction, and installing the bytecode trusted application with the second identification information at a set position of the native trusted application corresponding to the first identification information according to the installation instruction and based on an open trust protocol, OTRP; sending return information of successful installation to the CA after installation is successful; and enabling the CA to initiate a second access request after receiving the return information.

Since the principle of solving the problem by the above computer-readable storage medium is similar to that of the trusted application calling method, the implementation of the above computer-readable storage medium can be referred to the implementation of the method, and repetition is not repeated.

The computer-readable storage medium described above may be any available medium or data storage device that can be accessed by a processor in an electronic device, includes but not limited to, magnetic memory such as floppy disk, hard disk, magnetic tape, magneto-optical disk (MO), etc., optical memory such as CD, DVD, BD, HVD, etc., and semiconductor memory such as ROM, EPROM, EEPROM, non-volatile memory (NAND FLASH), solid state disk (SSD), etc.

Those skilled in the art should understand that embodiments of the present application can be provided as methods, systems or computer program products. Therefore, the present application can adopt forms of full hardware embodiments, full software embodiments, or embodiments combining software and hardware aspects. Moreover, the present application can adopt a form of the computer program products implemented on one or more computer available storage mediums (including but not limited to a disk memory, CD-ROM, an optical memory and the like) containing computer available program codes.

The present application is described with reference to flow charts and/or block diagrams of the methods, the devices (systems), and the computer program products according to embodiments of the present application. It should be understood that each flow and/or block in the flow charts and/or the block diagrams and combinations of the flows and/or the blocks in the flow charts and/or the block diagrams can be implemented by computer program instructions. The computer program instructions may be provided to a processor of a general-purpose computer, a special-purpose computer, an embedded processing machine or other programmable data processing device, thereby generating a machine, such that the instructions, when executed by the processor of the computers or other programmable data processing device, generate devices for implementing functions specified in one or more flows in the flow charts and/or one or more blocks in the block diagrams.

The computer program instructions may also be stored in a computer readable memory which can guide the computers or other programmable data processing device to work in a specific mode, thus the instructions stored in the computer readable memory generates an article of manufacture that includes a commander device that implement the functions specified in one or more flows in the flow charts and/or one or more blocks in the block diagrams.

The computer program instructions may also be loaded to the computers or other programmable data processing device, so that a series of operating steps may be executed on the computers or other programmable equipment to generate computer-implemented processing, such that the instructions executed on the computers or other programmable equipment provide steps for implementing the functions specified in one or more flows in the flow charts and/or one or more blocks in the block diagrams.

Obviously, those skilled in the art can make various modifications and variations to the present application without departing from the spirit and scope of the present application. In this way, if these modifications and variations of the present application fall within the scope of the claims of the present application and their equivalent art, the present application also intends to include these modifications and variations.

What is claimed is:

1. An electronic device, comprising: a client application (CA), and at least one processor configured to execute program code to implement a trusted application development platform; wherein:
   the CA is configured to initiate a first access request for a native trusted application of a trusted execution environment operating system linked with the trusted application development platform and corresponding to the CA, the first access request carries first identification information of the electronic device and second identification information of a bytecode trusted application of any application;
   the trusted application development platform is configured to receive the first access request, determine a native trusted application corresponding to the first identification information from native trusted applications respectively corresponding to at least two trusted execution environment operating systems linked with the trusted application development platform according to the first identification information, and send the first access request to the native trusted application corresponding to the first identification information;
   the native trusted application corresponding to the first identification information is configured to receive the first access request and determine whether the native trusted application corresponding to the first identification information is installed with a bytecode trusted application with the second identification information, and when the native trusted application corresponding to the first identification information is installed with the bytecode trusted application with the second identification information, return confirmation information to the CA;
   the CA is further configured to send a calling command to the native trusted application corresponding to the first identification information after receiving the confirmation information;
   the native trusted application corresponding to the first identification information is further configured to forward the calling command received from the CA to the bytecode trusted application with the second identification information;
   wherein the native trusted application corresponding to the first identification information is further configured to return prompt information of non-installation to the CA when determining that the native trusted application corresponding to the first identification information is not installed with the bytecode trusted application corresponding to the second identification information;
   the CA is further configured to send an installation instruction for installing the bytecode trusted application with the second identification information to the native trusted application corresponding to the first identification information;
   the native trusted application corresponding to the first identification information is further configured to install the bytecode trusted application with the second identification information at a set position of the native trusted application corresponding to the first identification information according to the installation instruction and based on an open trust protocol (OTRP), and send return information of successful installation to the CA after installation is successful;
   the CA is further configured to initiate a second access request after receiving the return information.

2. The electronic device according to claim 1, wherein the at least one processor is configured to execute the program code to:
   a creating module, configured to create the trusted application development platform based on a bytecode technology supporting a cross-platform function, wherein the trusted application development platform is linked with native trusted applications respectively corresponding to at least two trusted execution environment operating systems.

3. The electronic device according to claim 1, wherein the at least one processor is configured to execute the program code to: a trusted application management platform;
   the CA is further configured to send an installation request for installing the bytecode trusted application with the second identification information to the trusted application management platform;
   the trusted application management platform is configured to receive the installation request, assemble an open trust protocol (OTRP) message comprising installation information of the bytecode trusted application with the second identification information according to the installation request, and send the OTRP message to the CA;
   the CA is configured to receive the OTRP message, and send the OTRP message and the installation instruction for installing the bytecode trusted application with the second identification information to the native trusted application corresponding to the first identification information.

4. A trusted application calling method, being applied to a client application (CA), the trusted application calling method comprising:

initiating a first access request for a native trusted application of a trusted execution environment operating system linked with a trusted application development platform and corresponding to the CA, wherein the first access request carries first identification information of an electronic device to which the CA belongs and second identification information of a bytecode trusted application of any application; enabling the trusted application development platform to receive the first access request, enabling the trusted application development platform to determine a native trusted application corresponding to the first identification information from native trusted applications respectively corresponding to at least two trusted execution environment operating systems linked with the trusted application development platform according to the first identification information, and enabling the trusted application development platform to send the first access request to the native trusted application corresponding to the first identification information;

receiving confirmation information returned by the native trusted application corresponding to the first identification information, wherein the confirmation information is sent after the native trusted application corresponding to the first identification information receives the first access request and determines that the native trusted application corresponding to the first identification information is installed with a bytecode trusted application with the second identification information;

sending a calling command to the native trusted application corresponding to the first identification information, and enabling the native trusted application corresponding to the first identification information to forward the calling command received from the CA to the bytecode trusted application with the second identification information;

sending an installation instruction for installing the bytecode trusted application with the second identification information to the native trusted application corresponding to the first identification information when receiving prompt information of non-installation returned by the native trusted application corresponding to the first identification information; enabling the native trusted application corresponding to the first identification information to install the bytecode trusted application with the second identification information at a set position of the native trusted application corresponding to the first identification information according to the installation instruction and based on an open trust protocol (OTRP);

receiving return information sent by the native trusted application corresponding to the first identification information, and initiating a second access request, wherein the return information is sent after the native trusted application corresponding to the first identification information is successfully installed with the bytecode trusted application with the second identification information.

5. The trusted application calling method according to claim 4, wherein after receiving the prompt information of non-installation returned by the native trusted application corresponding to the first identification information and before sending the installation instruction for installing the bytecode trusted application with the second identification information to the native trusted application corresponding to the first identification information, the method further comprises:

sending an installation request for installing the bytecode trusted application with the second identification information to a trusted application management platform;

receiving an open trust protocol (OTRP) message sent by the trusted application management platform and comprising installation information of the bytecode trusted application with the second identification information, wherein the OTRP message is sent after the trusted application management platform receives the installation request and successfully assembles the OTRP message according to the installation request;

wherein said sending the installation instruction for installing the bytecode trusted application with the second identification information to the native trusted application corresponding to the first identification information comprises:

sending the OTRP message and the installation instruction for installing the bytecode trusted application with the second identification information to the native trusted application corresponding to the first identification information.

6. A trusted application calling method, being applied to a native trusted application, the method comprising:

receiving a first access request, wherein the first access request carries first identification information of an electronic device and second identification information of a bytecode trusted application of any application;

determining whether a bytecode trusted application with the second identification information is installed in the native trusted application, and when the bytecode trusted application with the second identification information is installed in the native trusted application, returning confirmation information to a CA;

receiving a calling command sent by the CA, wherein the calling command is a command sent by the CA to the native trusted application corresponding to the first identification information after the CA receives the confirmation information;

forwarding the calling command received from the CA to the bytecode trusted application with the second identification information;

when determining that the bytecode trusted application with the second identification information is not installed, returning prompt information of non-installation to the CA, and enabling the CA to send an installation instruction for installing the bytecode trusted application with the second identification information to the native trusted application corresponding to the first identification information;

receiving the installation instruction, and installing the bytecode trusted application with the second identification information at a set position of the native trusted application corresponding to the first identification information according to the installation instruction and based on an open trust protocol (OTRP); sending return information of successful installation to the CA after installation is successful; and enabling the CA to initiate a second access request after receiving the return information.

* * * * *